United States Patent
Kachmar et al.

(10) Patent No.: US 7,873,249 B2
(45) Date of Patent: Jan. 18, 2011

(54) FOAMED FIBER OPTIC CABLE

(75) Inventors: Wayne M. Kachmar, North Bennington, VT (US); Kenneth Christopher Nardone, North Bennington, VT (US); Ronald J. Kleckowski, Manchester Center, VT (US)

(73) Assignee: ADC Telecommunications, Inc., Eden Prairie, MN (US)

(*) Notice: Subject to any disclaimer, the term of this patent is extended or adjusted under 35 U.S.C. 154(b) by 0 days.

(21) Appl. No.: 12/472,939

(22) Filed: May 27, 2009

(65) Prior Publication Data

US 2009/0324180 A1     Dec. 31, 2009

Related U.S. Application Data

(60) Provisional application No. 61/056,408, filed on May 27, 2008.

(51) Int. Cl.
*G02B 6/44* (2006.01)
(52) U.S. Cl. ........................................ 385/102; 385/123
(58) Field of Classification Search ......... 385/102–108, 385/123–128
See application file for complete search history.

(56) References Cited

U.S. PATENT DOCUMENTS

| | | | |
|---|---|---|---|
| 3,173,990 A | 3/1965 | Lamons | |
| 3,687,748 A | 8/1972 | Clock et al. | |
| 3,991,014 A | 11/1976 | Kleinschuster | |
| 4,067,852 A | 1/1978 | Calundann et al. | |
| 4,083,829 A | 4/1978 | Calundann | |
| 4,130,545 A | 12/1978 | Calundann | |
| 4,143,942 A | 3/1979 | Anderson | |
| 4,161,470 A | 7/1979 | Calundann | |
| 4,318,842 A | 3/1982 | East et al. | |
| 4,468,364 A | 8/1984 | Ide | |
| 5,675,686 A | 10/1997 | Rosenmayer et al. | |
| 5,745,627 A | 4/1998 | Arroyo et al. | |
| 5,920,672 A | 7/1999 | White | |
| 6,037,546 A | 3/2000 | Mottine et al. | |
| 6,160,940 A | 12/2000 | Summers et al. | |
| 6,210,802 B1 | 4/2001 | Risch et al. | |

(Continued)

OTHER PUBLICATIONS

"Personal flotation device: Information from Answers.com", May 25, 2007, [online], [retrieved on May 28, 2010] Retrieved from Internet Archive Wayback Machine website <URL: http://web.archive.org/web/*/http://www.answers.com/topic/life-vest-1>.*

(Continued)

*Primary Examiner*—Frank G Font
(74) *Attorney, Agent, or Firm*—Merchant & Gould P.C.

(57) ABSTRACT

A fiber optic cable includes an optical fiber, a strength layer surrounding the optical fiber, and a jacket assembly surrounding the strength layer. The jacket assembly includes a foam. A method for manufacturing a fiber optic cable includes mixing a base material, a chemical foaming agent and a shrinkage reduction material into a mixture in an extruder. The mixture is heated so that the base material and the chemical foaming agent form a foam with shrinkage reduction material embedded into the foam. An optical fiber and strength layer are fed into a crosshead. The mixture is extruded around the optical fiber and the strength layer to form a jacket assembly.

8 Claims, 3 Drawing Sheets

U.S. PATENT DOCUMENTS

| | | |
|---|---|---|
| 6,278,826 B1 | 8/2001 | Sheu |
| 6,374,023 B1 | 4/2002 | Parris |
| 6,463,199 B1 | 10/2002 | Quinn et al. |
| 7,016,585 B2 | 3/2006 | Diggle, III et al. |
| 7,224,872 B2 | 5/2007 | Goldner et al. |
| 7,346,244 B2 | 3/2008 | Gowan et al. |
| 2006/0159407 A1 | 7/2006 | Kachmar |
| 2007/0127878 A1 | 6/2007 | DeMontmorillon et al. |
| 2007/0280615 A1 | 12/2007 | DeMontmorillon et al. |
| 2008/0013899 A1 | 1/2008 | Gowan et al. |
| 2008/0205830 A1 | 8/2008 | Cook |

OTHER PUBLICATIONS

International Search Report and Written Opinion mailed Jan. 6, 2010.

* cited by examiner

FOAMED FIBER OPTIC CABLE

CROSS-REFERENCE TO RELATED APPLICATIONS

The present application claims priority to U.S. Provisional Patent Application Ser. No. 61/056,408 entitled "Foamed Fiber Optic Cable" and filed on May 27, 2008, the disclosure of which is hereby incorporated by reference in its entirety.

BACKGROUND

As fiber to the home is extended into more and different living units, the cables used must provide more and more resistance to difficult installation requirements. In many cases, methods of installing cables made of copper are employed for fiber optic cables. The installation conditions and bend and impact rules are different as copper is a malleable metal and conducts electricity regardless of physical shape and does not degrade significantly under poor installation conditions. Optical fiber cables of small diameter must protect against many new forms of installation abuse that do not affect copper drop cables. These include sensitivity to sharp bends and resistance to impacts such as flat staples installed along structural building components such as beams and trim boards.

SUMMARY

An aspect of the present disclosure relates to a fiber optic cable. The fiber optic cable includes an optical fiber, a strength layer surrounding the optical fiber, and a jacket assembly surrounding the strength layer. The jacket assembly includes a foam.

Another aspect of the present disclosure relates to a fiber optic cable. The fiber optic cable includes an optical fiber, a strength layer surrounding the optical fiber and a jacket assembly surrounding the strength layer. The jacket assembly includes an inner layer and an outer layer. The inner layer is a foam having a plurality of shrinkage reduction members embedded in the foam.

Another aspect of the present disclosure relates to a method of manufacturing a fiber optic cable. The method includes mixing a base material, a chemical foaming agent and a shrinkage reduction material into a mixture in an extruder. The mixture is heated so that the base material and the chemical foaming agent form a foam with shrinkage reduction material embedded into the foam. An optical fiber and strength layer are fed into a crosshead. The mixture is extruded around the optical fiber and the strength layer to form a jacket assembly.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
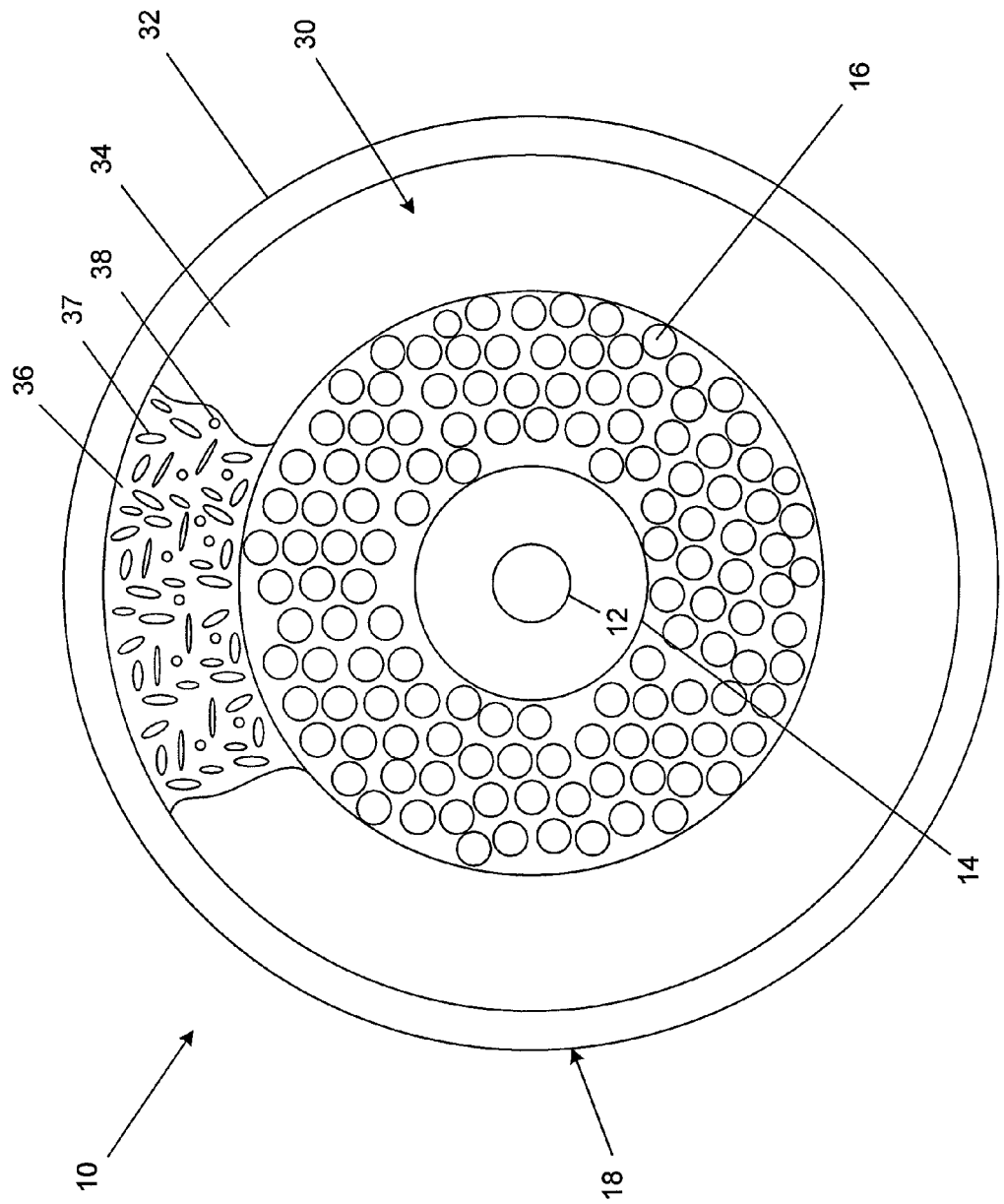
FIG. 1 is a cross-sectional view of a fiber optic cable having exemplary features of aspects in accordance with the principles of the present disclosure.

Referring now to FIG. 1, a fiber optic cable, generally designated 10, is shown. The fiber optic cable 10 includes at least one optical fiber, generally designated 12, a buffer layer 14 surrounding the optical fiber 12, a strength layer 16 surrounding the buffer layer 14, and a jacket assembly 18 surrounding the strength layer 16.

Figure 2:
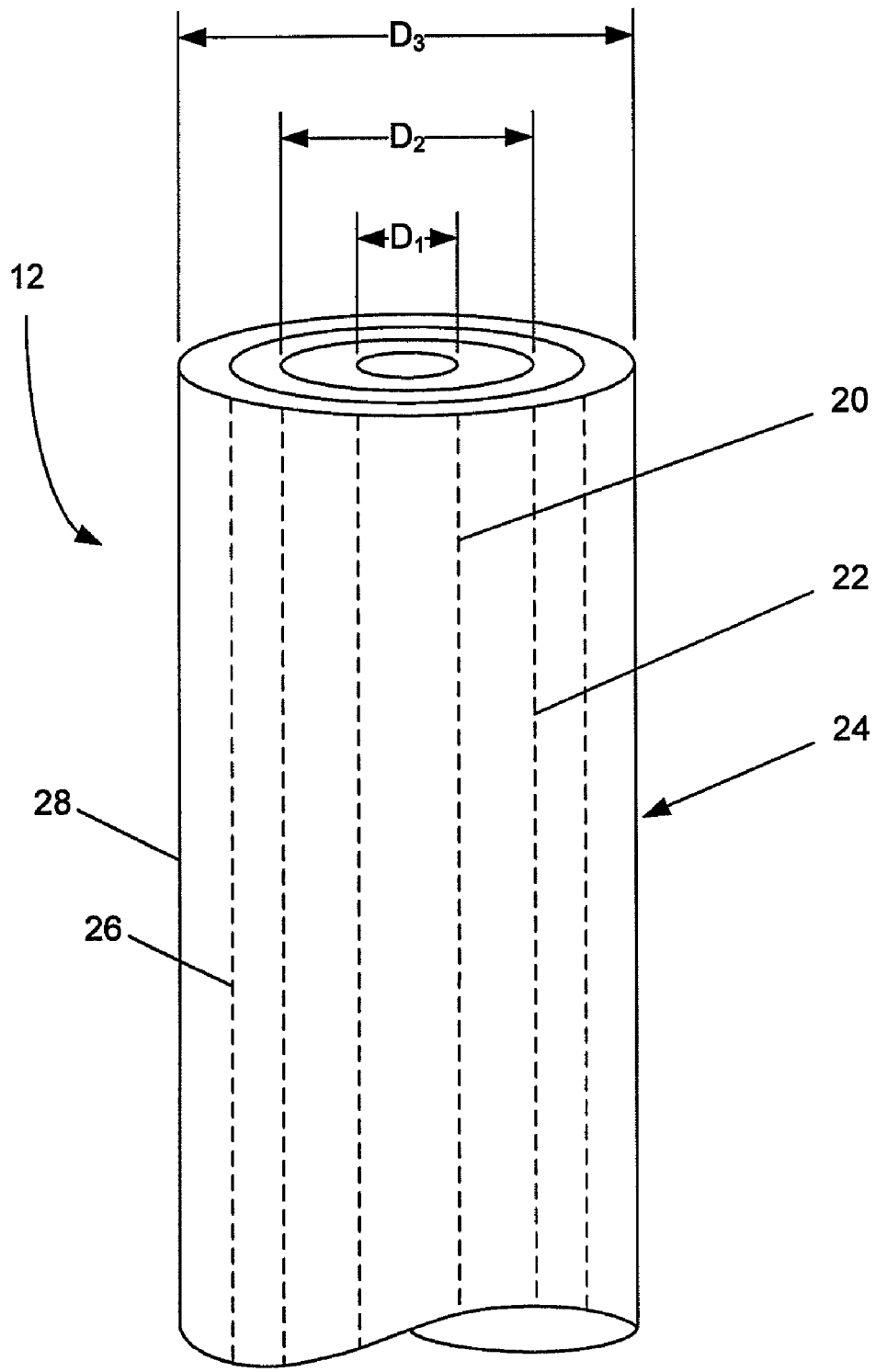
FIG. 2 is perspective view of an optical fiber suitable for use in the fiber optic cable of FIG. 1.

Referring now to FIG. 2, the optical fiber 12 is shown. The optical fiber 12 includes a core 20. The core 20 is made of a glass material, such as a silica-based material, having a first index of refraction. In the subject embodiment, the core 20 has an outer diameter $D_1$ of less than or equal to about 10 µm.

The core 20 of the optical fiber 12 is surrounded by a cladding 22 that is also made of a glass material, such as a silica based-material. The cladding 22 defines a second index of refraction that is less than the first index of refraction defined by the core 20. This difference between the first index of refraction of the core 20 and the second index of refraction of the cladding 22 allows an optical signal that is transmitted through the optical fiber 12 to be confined to the core 20. In the subject embodiment, the cladding 22 has an outer diameter $D_2$ of less than or equal to about 125 µm.

A coating, generally designated 24, surrounds the cladding 22. The coating 24 includes an inner layer 26 and an outer layer 28. In the subject embodiment, the inner layer 26 of the coating 24 is immediately adjacent to the cladding 22 such that the inner layer 26 surrounds the cladding 22. The inner layer 26 is a polymeric material (e.g., polyvinyl chloride, polyethylenes, polyurethanes, polypropylenes, polyvinylidene fluorides, ethylene vinyl acetate, nylon, polyester, or other materials) having a low modulus of elasticity. The low modulus of elasticity of the inner layer 26 functions to protect the optical fiber 12 from microbending.

The outer layer 28 of the coating 24 is a polymeric material having a higher modulus of elasticity than the inner layer 26. In the subject embodiment, the outer layer 28 of the coating 24 is immediately adjacent to the inner layer 26 such that the outer layer 28 surrounds the inner layer 26. The higher modulus of elasticity of the outer layer 28 functions to mechanically protect and retain the shape of optical fiber 12 during handling. In the subject embodiment, the outer layer 28 defines an outer diameter $D_3$ of less than or equal to 250 µm.

In the subject embodiment, the optical fiber 12 is manufactured to reduce the sensitivity of the optical fiber 12 to micro or macro-bending (hereinafter referred to as "bend insensitive"). Exemplary bend insensitive optical fibers 12 have been described in U.S. Pat. Application Publication Nos. 2007/0127878 and 2007/0280615 and are hereby incorporated by reference in their entirety. An exemplary bend insensitive optical fiber 12 suitable for use in the fiber optic cable 10 of the present disclosure is commercially available from Draka Comteq under the name BendBright XS.

Referring again to FIG. 1, the buffer layer 14 is depicted as a tight layer that surrounds the optical fiber 12. It will be understood, however, that the scope of the present disclosure is not limited to the buffer layer 14 being a tight layer.

The buffer layer 14 can have any number of conventionally known constructions. For example, the buffer layer 14 can be made of a polymeric material such as polyvinyl chloride (PVC). Other polymeric materials (e.g., polyethylenes, polyurethanes, polypropylenes, polyvinylidene fluorides, ethylene vinyl acetate, nylon, polyester, or other materials) may also be used. In the subject embodiment, the buffer layer 14 defines an outer diameter that is less than or equal to about 1 mm. In another embodiment, the outer diameter of the buffer layer 14 is less than or equal to about 900 µm.

The strength layer 16 is adapted to inhibit axial tensile loading from being applied to the optical fiber 12. In the subject embodiment, the strength layer 16 extends the length of the fiber optic cable 10 and is disposed in a generally longitudinal direction along the fiber optic cable 10 between the buffer layer 14 and the jacket assembly 18. In certain embodiment, the strength layer 16 can include yarns, fibers, threads, tapes, films, epoxies, filaments or other structures. In a preferred embodiment, the strength layer 16 includes a plurality of aramid yarns (e.g., KEVLAR® yarns).

The jacket assembly 18 includes an inner layer 30 and an outer layer 32. In the subject embodiment, the outer layer 32 is the outermost layer of the jacket assembly 18.

The inner layer 30 includes a material, generally designated 34. The material 34 includes foam 36. In the subject embodiment, the foam 36 is closed cell foam. The closed cell foam 36 thickens the material 34 and provides a deformation characteristic. In one embodiment, the foam 36 is formed using a chemical foaming agent. An exemplary chemical foaming agent is suitable for use with the fiber optic cable 10 is sold under the brand name EXPANCEL® by Akzo Nobel N. V.

The chemical foaming agent facilitates the formation of air bubbles 37 in the foam 36. In one embodiment, the percentage of air bubble formation in the foam 36 is about 5% to about 50%. In another embodiment, the percentage of air bubble formation in the foam 36 is about 10% to about 50%. In another embodiment, the percentage of air bubble formation in the foam 36 is about 15% to about 50%. In another embodiment, the percentage of air bubble formation in the foam 36 is about 20% to about 50%. In another embodiment, the percentage of air bubble formation in the foam 36 is about 25% to about 50%.

In the subject embodiment, the material 34 further includes a plurality of shrinkage reduction members 38. The plurality of shrinkage reduction members 38 is embedded into the foam 36. The shrinkage reduction members 38 are made of a shrinkage reduction material. In one embodiment, the shrinkage reduction material is liquid crystal polymer (LCP). Examples of liquid crystal polymers suitable for use in the multi-fiber cable assembly 10 are described in U.S. Pat. Nos. 3,991,014; 4,067,852; 4,083,829; 4,130,545; 4,161,470; 4,318,842; and 4,468,364 and are hereby incorporated by reference in their entireties. The shrinkage reduction members 38 act as a thermal stabilizer so as to minimize the effects of thermal shrinkage of the fiber optic cable 10.

In the subject embodiment, the amount of shrinkage reduction material is less than about 5% by weight of the jacket assembly 18. In another embodiment, the amount of shrinkage reduction material is less than about 3% by weight of the jacket assembly 18. In another embodiment, the amount of shrinkage reduction material is less than about 2% by weight of the jacket assembly 18. In another embodiment, the amount of shrinkage reduction material is less than about 1% by weight of the jacket assembly 18.

In another embodiment, the amount of shrinkage reduction material is less than about 5% by weight of the inner layer 30 of the jacket assembly 18. In another embodiment, the amount of shrinkage reduction material is less than about 3% by weight of the inner layer 30 of the jacket assembly 18. In another embodiment, the amount of shrinkage reduction material is less than about 2% by weight of the inner layer 30 of the jacket assembly 18. In another embodiment, the amount of shrinkage reduction material is less than about 1% by weight of the inner layer 30 of the jacket assembly 18.

As the inner layer 30 may be susceptible to abrasion and tearing, the outer layer 32 is disposed over the inner layer 30. In one embodiment, the outer layer 32 is a thin layer of material that is extruded over the inner layer 30.

The outer layer 32 is a polymer material. Example polymer materials suitable for use for the outer layer 32 include conventional thermoplastic polymers such as polyethylene, polypropylene, ethylene-propylene, copolymers, polystyrene, and styrene copolymers, polyvinyl chloride, polyamide (nylon), polyesters such as polyethylene terephthalate, polyetheretherketone, polyphenylene sulfide, polyetherimide, polybutylene terephthalate, low smoke zero halogens polyolefins and polycarbonate, as well as other thermoplastic materials. Additives may also be added to the material. Example additives include pigments, fillers, coupling agents, flame retardants, lubricants, plasticizers, ultraviolet stabilizers or other additives. In one embodiment, the outer layer 32 includes the shrinkage reduction members 38.

In one embodiment, the total amount of shrinkage reduction material in the outer layer 32 and the inner layer 30 is less than about 5% by weight of the jacket assembly 18. In another embodiment, the total amount of shrinkage reduction material 38 in the outer layer 32 and the inner layer 30 is less than about 3% by weight of the jacket assembly 18. In another embodiment, the total amount of shrinkage reduction material 38 in the outer layer 32 and the inner layer 30 is less than about 2% by weight of the jacket assembly 18. In another embodiment, the total amount of shrinkage reduction material 38 in the outer layer 32 and the inner layer 30 is less than about 1% by weight of the jacket assembly 18.

In one embodiment, the outer diameter of the jacket assembly 18 is less than or equal to about 6 mm. In another embodiment, the outer diameter of the jacket assembly 18 is less than or equal to about 5 mm. In another embodiment, the outer diameter of the jacket assembly 18 is less than or equal to about 4 mm. In another embodiment, the outer diameter of the jacket assembly 18 is less than or equal to about 3 mm.

The fiber optic cable 10 of the present disclosure is potentially advantageous as it can provide resistance to impact. The inner layer 30 of the jacket assembly 18 deforms when acted upon by an impact load (e.g., staple, hammer, etc.). This deformation allows the fiber optic cable 10 to distribute the impact load over a larger cross-sectional area.

Figure 3:
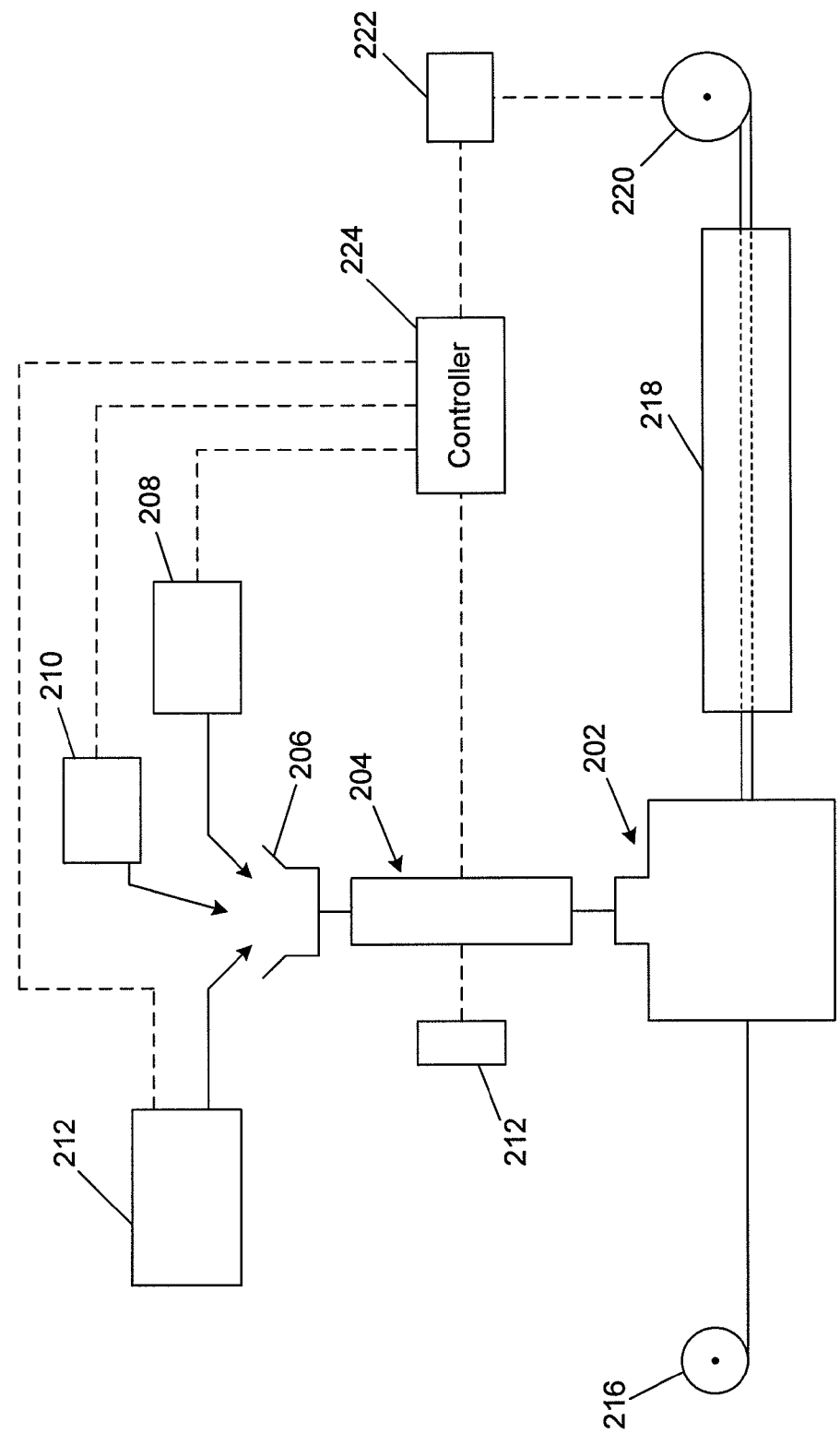
FIG. 3 is a schematic representation of a system for manufacturing the fiber optic cable of FIG. 1.

Referring now to FIGS. 1 and 3, a system 200 for manufacturing the fiber optic cable 10 will now be described. The system 200 includes a crosshead, generally designated 202, that receives thermoplastic material from an extruder 204. A hopper 206 is used to feed materials into the extruder 204. A first conveyor 208 conveys the base material to the hopper 206. A second conveyor 210 conveys the chemical foaming agent to the hopper 206. In one embodiment, a third conveyor 212 conveys the shrinkage reduction material to the hopper 206.

From the hopper 206, the base material, the chemical foaming agent and the shrinkage reduction material move into the extruder 204. In one embodiment, the mixture moves by gravity into the extruder 204. In the extruder 204, the base material, the chemical foaming agent and the shrinkage reduction material are mixed, masticated and heated. The base material, the chemical foaming agent and the shrinkage reduction material are mixed and masticated in order to form a mixture having a uniform distribution.

The extruder 204 is heated by a heating system 212 that may include one or more heating elements for heating zones of the extruder 204 as well as the crosshead 202 to desired processing temperatures. As the mixture is heated, the chemical foaming agent facilitates the formation of the foam 36.

If the shrinkage reduction material is liquid crystal polymer, the mixture is headed to a temperature greater than the melting temperature of the base material but less than the melting temperature of the shrinkage reduction material. The temperature is preferably sufficiently high to soften the shrinkage reduction material such that the shrinkage reduction material is workable and extrudable.

The extruder 204 also functions to convey the mixture to the crosshead 202. The extruder 204 provides pressure for forcing the mixture through the crosshead 202.

The optical fiber 14 is fed into the crosshead 202 from a feed roll 216. The strength layer 16 surrounds the optical fiber 14.

After the fiber optic cable 10 is extruded from the crosshead 202, the fiber optic cable 10 is cooled and shape set at a water trough 218. The extrusion process can be a pressure or semi-pressure extrusion process where product leaves the crosshead 202 at the desired shape, or an annular extrusion process where the product is drawn down after extrusion. The cooled final product is stored on a take-up roll 220 rotated by a drive mechanism 222. A controller 224 coordinates the operation of the various components of the system 200.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A fiber optic cable comprising:
   an optical fiber;
   a strength layer surrounding the optical fiber;
   a jacket assembly surrounding the strength layer, the jacket assembly including a foam having a closed cell structure and including a percentage of air bubbles in a range of about 5% to about 50%, the foam including a plurality of shrinkage reduction members embedded in the foam.

2. A fiber optic cable as claimed in claim 1, wherein the jacket assembly includes an outer layer surrounding the foam.

3. A fiber optic cable as claimed in claim 2, wherein the outer layer is made of a polymer material.

4. A fiber optic cable as claimed in claim 3, wherein the polymer material of the outer layer includes shrinkage reduction material.

5. A fiber optic cable comprising:
   an optical fiber;
   a strength layer surrounding the optical fiber;
   a jacket assembly surrounding the strength layer, wherein the jacket assembly includes an inner layer and an outer layer, the inner layer is a foam having a closed cell structure, the foam includes a percentage of air bubbles in the range of about 5% to about 50%, the inner layer including a plurality of shrinkage reduction members embedded in the foam, the shrinkage reduction members being of a liquid crystal polymer material.

6. A fiber optic cable as claimed in claim 5, wherein the jacket assembly includes an outer layer surrounding the foam.

7. A fiber optic cable as claimed in claim 6, wherein the outer layer is made of a polymer material.

8. A fiber optic cable as claimed in claim 7, wherein the polymer material of the outer layer includes shrinkage reduction material.

* * * * *